(12) United States Patent
Amabile

(10) Patent No.: US 8,820,831 B2
(45) Date of Patent: Sep. 2, 2014

(54) SAFETY BAR FOR VEHICLES

(76) Inventor: Gerald Amabile, Archbald, PA (US)

(*) Notice: Subject to any disclaimer, the term of this patent is extended or adjusted under 35 U.S.C. 154(b) by 381 days.

(21) Appl. No.: 13/134,232

(22) Filed: Jun. 2, 2011

(65) Prior Publication Data
US 2012/0306246 A1 Dec. 6, 2012

(51) Int. Cl.
B60N 2/42 (2006.01)

(52) U.S. Cl.
CPC ............ *B60N 2/4228* (2013.01); *B60N 2/4221* (2013.01)
USPC .................................................... 297/216.14

(58) Field of Classification Search
CPC ..... B60N 2/4221; B60N 2/4228; B60N 2/688
USPC ........ 297/216.13, 216.14, 487, 488; 280/751; 296/63, 68.1
See application file for complete search history.

(56) References Cited

U.S. PATENT DOCUMENTS

| 3,453,026 | A | * | 7/1969 | Paes et al. | 297/487 |
| 3,591,232 | A | * | 7/1971 | Simon | 297/216.1 |
| 3,899,042 | A | * | 8/1975 | Bonar | 297/487 |
| 4,796,913 | A | * | 1/1989 | Amabile et al. | 280/751 |
| 6,394,492 | B1 | * | 5/2002 | Corbett | 280/751 |

* cited by examiner

Primary Examiner — Milton Nelson, Jr.
(74) Attorney, Agent, or Firm — Ryder, Lu, Mazzeo & Konieczny LLC

(57) ABSTRACT

A passenger restraint system for a vehicle is disclosed. Embodiments provide an automatic release mechanism to automatically lift a restraint bar in the event of a rear-end collision, thereby reducing the risk of occupants getting rammed by the safety bar due to seat deflection from the seat in front of the occupant. A linkage is connected between the seat and an interior surface of the vehicle, such as wall or floor. During a rear-end collision, occupants are pushed back into their seats, and depending on the force of the impact, the seats will deflect rearward. The linkage is coupled to a lifting mechanism, such that when the seat back deflects during a collision, tension in the linkage operates to lift the restraint bar, thereby reducing the risk of injury for occupants sitting in the seat behind the restraining bar, such as in a school bus, for example.

19 Claims, 13 Drawing Sheets

SAFETY BAR FOR VEHICLES

FIELD OF THE INVENTION

The present invention relates to passenger restraining devices for vehicles. More specifically, the present invention relates to passenger restraining devices for school buses.

BACKGROUND OF THE INVENTION

U.S. Pat. No. 4,796,913, to Amabile, et al is incorporated herein by reference, and is hereinafter referred to as the '913 patent. The '913 patent discloses a safety bar for vehicles. The '913 patent provides a variety of advantages, such as the ability of a bus driver or other monitor to quickly and accurately verify that the device is in use in every seat throughout the vehicle. However, the pursuit of safety for schoolchildren is ongoing, and it is therefore desirable to have an improved safety (restraint) bar for vehicles.

SUMMARY OF THE INVENTION

While the '913 patent disclosed a device that improved passenger safety in a school bus, there are various improvements over the '913 device that are addressed in embodiments of the present invention. In particular, embodiments of the present invention provide:

A passenger restraint system which comprises an automatic release mechanism to automatically lift the restraint bar in the event of a rear-end collision, thereby reducing the risk of occupants getting rammed by the safety bar due to seat deflection from the seat in front of the occupant;

a cam-shaped pad on the safety bar to provide an individual fit, depending on the size of the passenger; and a safety harness to provide additional protection for each passenger.

One or more of these safety features may be combined for a particular embodiment of the present invention. To accomplish the functionality of lifting the restraint bar in the event of a rearward seat deflection, a linkage is connected between the seat and an interior surface of the vehicle, such as wall or floor.

During a rear-end collision, occupants are pushed back into their seats, and depending on the force of the impact, the seats will deflect rearward a significant amount (e.g. at least 5 degrees. The linkage is coupled to a lifting mechanism, such that when the seat back deflects during a collision, tension in the linkage operates to lift the restraint bar, thereby reducing the risk of injury for occupants sitting in the seat behind the restraining bar, such as in a school bus, for example.

The rearward seat deflection required to activate the lifting mechanism is preferably at least 5 degrees, such that a rear-end collision will trigger the lifting mechanism, whereas a passenger simply leaning back in his seat will not cause sufficient seat deflection to activate the lifting mechanism.

In one aspect of an embodiment of the present invention, an automatic release mechanism for a restraint bar on a vehicle is provided, comprising:

a seat, the seat comprising a seat back, the seat back having a window side and an aisle side;

a first hinge plate mounted on the window side of the seat back;

a second hinge plate mounted on the aisle side of the seat back;

a cable, the cable having a first end affixed to an interior surface of the vehicle, and the cable having a second end affixed to a first release tab, the first release tab configured and disposed to move the restraint bar to an exit position when sufficient tension is applied to the cable;

a release rod having a first end and a second end, wherein the first end of the release rod is coupled to the first release tab, and the second end of the release rod is coupled to a second release tab, the second release tab configured and disposed to move the restraint bar to a raised (exit) position.

In another aspect of an embodiment of the present invention, a restraint bar for a vehicle is provided, wherein the restraint bar comprises a crossbar, and wherein the crossbar comprises one or more cam-shaped pads circumscribing the crossbar, and wherein the one or more cam-shaped pads are rotate-able, thereby providing a comfortable fit for a passenger.

In another aspect of an embodiment of the present invention, a harness for use with a restraint bar for a vehicle is provided, wherein the harness comprises two shoulder straps, the two shoulder straps each affixed to a center portion, a flap attached to the center portion, the flap comprising a fastening means, thereby providing a means for fastening the flap to the crossbar of the restraint bar.

DETAILED DESCRIPTION

Figure 1:
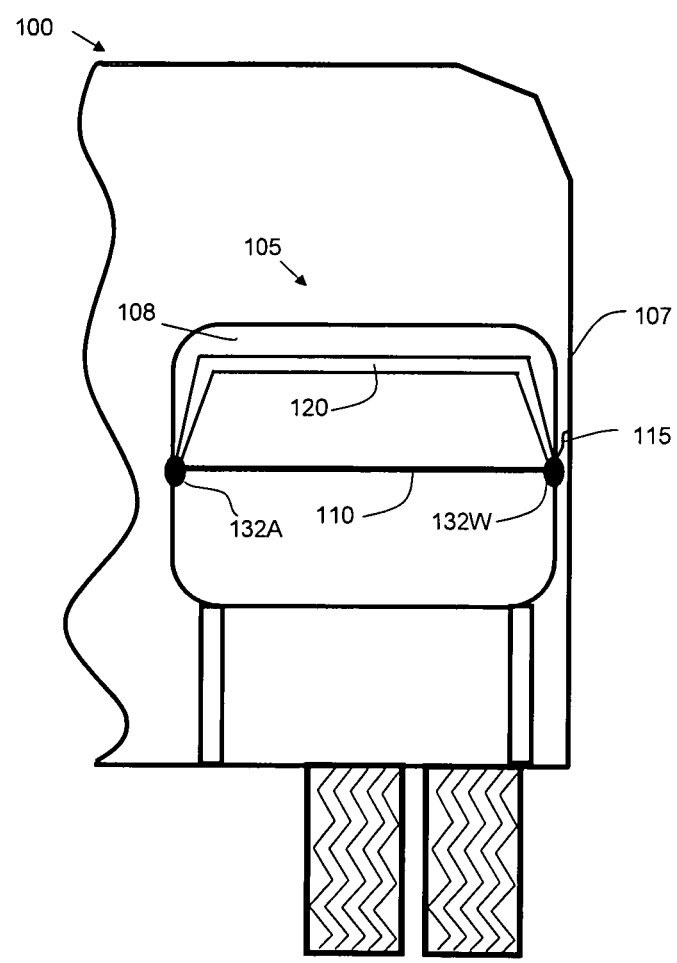
FIG. 1 shows a rear view of a school bus comprising an automatic release mechanism.

FIG. 1 shows a rear view of a vehicle 100 comprising an automatic release mechanism. In one embodiment, vehicle 100 is a school bus. Seat 105 has seat back 108 which faces a passenger sitting in a seat behind seat 105 (for an additional example, refer to FIG. 1 of the '913 patent, which shows how the restraint bar 16 that is affixed to seat 14a is used to protect the passenger sitting in seat 14b). Restraint bar 120, shown in an upright (exit) position, is used to restrain the sitting in a seat behind seat 105. Two hinge mechanisms 132A (aisle side) and 132W (window side) allow restraint bar 120 to move from the normal mode (36c of FIG. 3 of the '913 patent) to the entry/exit mode (see position of arm 36a of FIG. 3 of the '913 patent). A linkage 115 which may comprise a chain or a flexible cable is affixed to an interior surface of the bus, such as vehicle (bus) wall 107 at one end. The other end of cable (linkage) 115 is disposed to rotate release rod 110. When release rod 110 is rotated, restraint bar 120 is moved into the entry exit mode position. The details of the release mechanism will be explained in more detail in upcoming figures.

Figure 2:
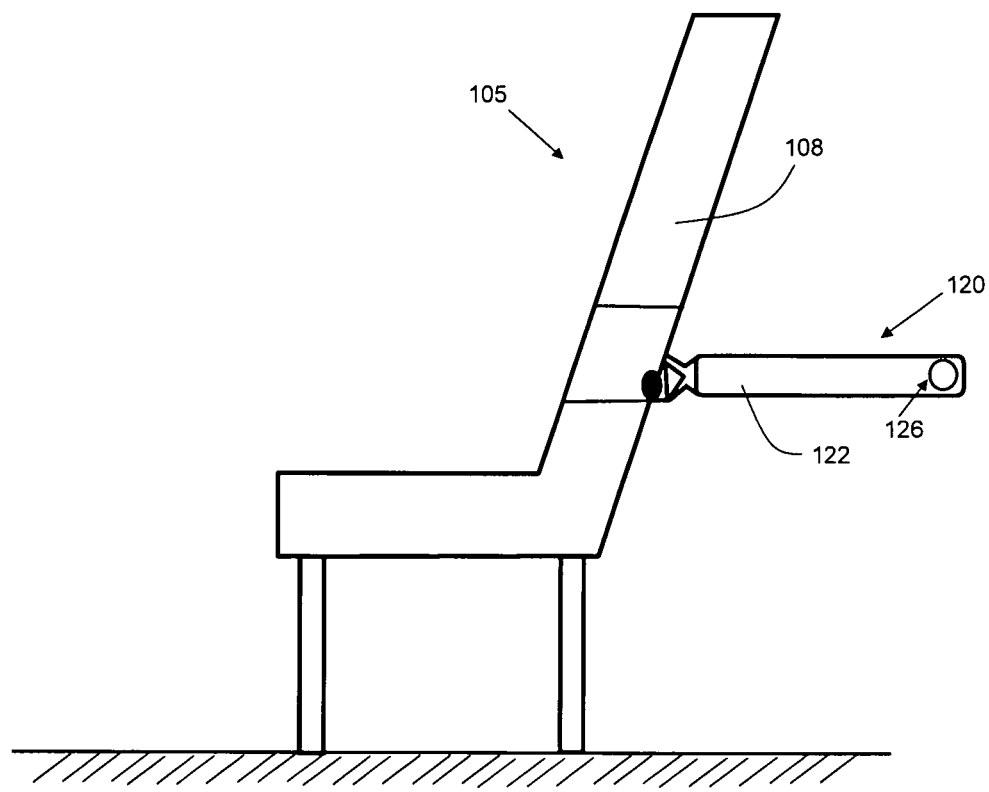
FIG. 2 shows a side view of a school bus seat comprising a (safety) restraint bar.

FIG. 2 shows a side view of a school bus seat 105 comprising seat back 108, and also comprising a restraint bar 120. One difference between embodiments of restraint bar 120, and the restraining bar of the '913 patent is the use of a cam-shaped pad along crossbar 126, which serves to provide a proper fit to passengers of varying size. The '913 patent did not provide such a cam-shaped pad.

Figure 3:
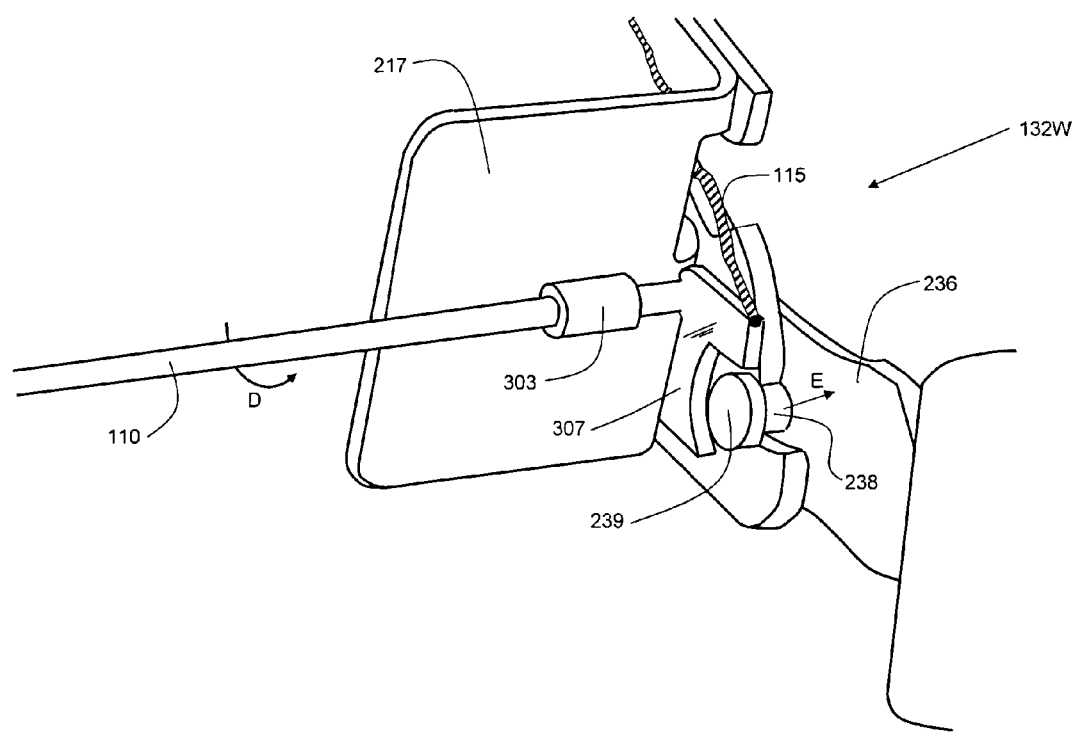
FIGS. 3-5 show details of an embodiment of the automatic release mechanism.

FIG. 3 shows details of an embodiment of the "window side" hinge mechanism 132W, and shows components of the automatic release mechanism. In this disclosure, references starting with 2xx are similar to XX numbered counterparts in the '913 patent. For example, retaining flange 239 is similar to retaining flange 39 shown in the '913 patent. One end of linkage (cable) 115 is attached to release tab 307. The other end of linkage (cable) 115 is affixed to the vehicle (bus) wall 107 (see FIG. 1). Release tab 307 is attached to release rod 110 through sleeve 303. Sleeve 303 is affixed to hinge plate 217, and allows release rod 110 to rotate therein.

In the event of a rear-end collision, inertia causes the seat back (108 of FIG. 2) to deflect rearward, causing cable 115 to pull release tab 307, which rotates and moves lock pin 238 in direction E, causing arm 236 of restraint bar 120 (see FIG. 2) to move from the normal travel mode to the traversing mode (also refer to FIG. 3 of the '913 patent). Release rod 110 rotates in direction D, which enables a similar release mechanism on the aisle side of the seat (explained further in FIG. 5).

Figure 4:
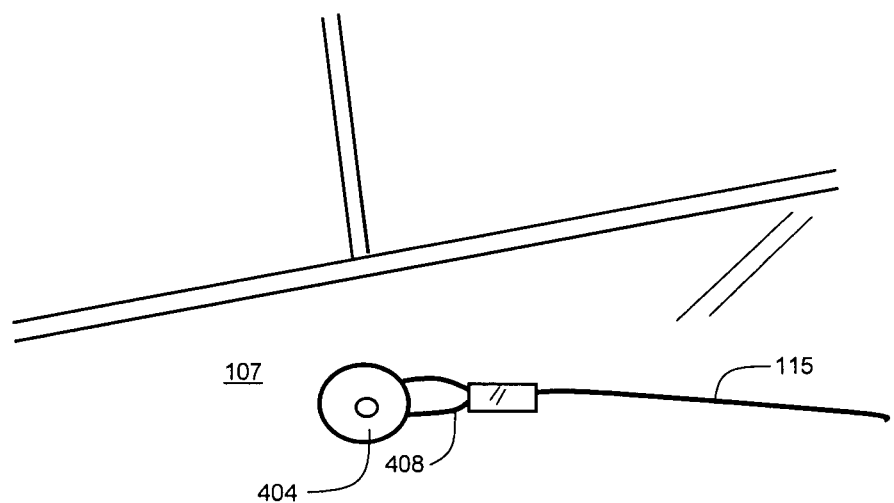

FIG. 4 shows cable 115 fastened to vehicle (bus) wall 107. In this embodiment, the end of cable 115 is formed in a loop 408, and fastened to vehicle (bus) wall 107 via fastener 404. In one embodiment fastener 404 is a rivet. In another embodiment, fastener 404 is a screw.

Figure 5:
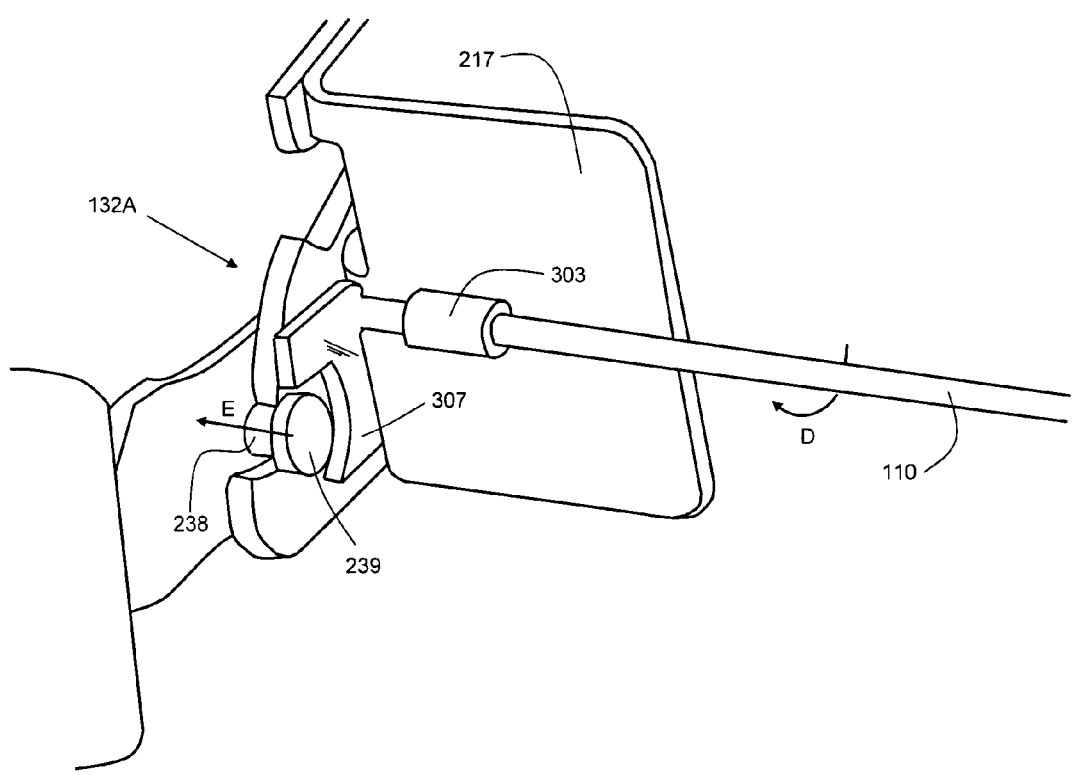

FIG. 5 shows details of an embodiment of the "aisle side" hinge mechanism 132A, and shows components of the automatic release mechanism. Similar to the window side hinge mechanism 132W, release tab 307 is attached to release rod 110 through sleeve 303. Sleeve 303 is affixed to hinge plate 217, and allows release rod 110 to rotate therein. When release rod 110 rotates in direction D, it causes the movement of lock pin 238 in direction E, causing arm 236 of restraint bar 120 (see FIG. 2) to move from the normal travel mode to the traversing mode (refer to FIG. 3 of the '913 patent). In this way, the restraint bar 120 does not get pushed into the passenger behind it during a rear impact collision (e.g. if a vehicle hits the school bus from behind whilst stopped at a traffic light), yet the restraint bar 120 does stay in the normal position during a front collision (e.g. if the school bus rammed into a wall), serving to keep the occupants from being strewn about the passenger cabin of the bus.

Figure 6:
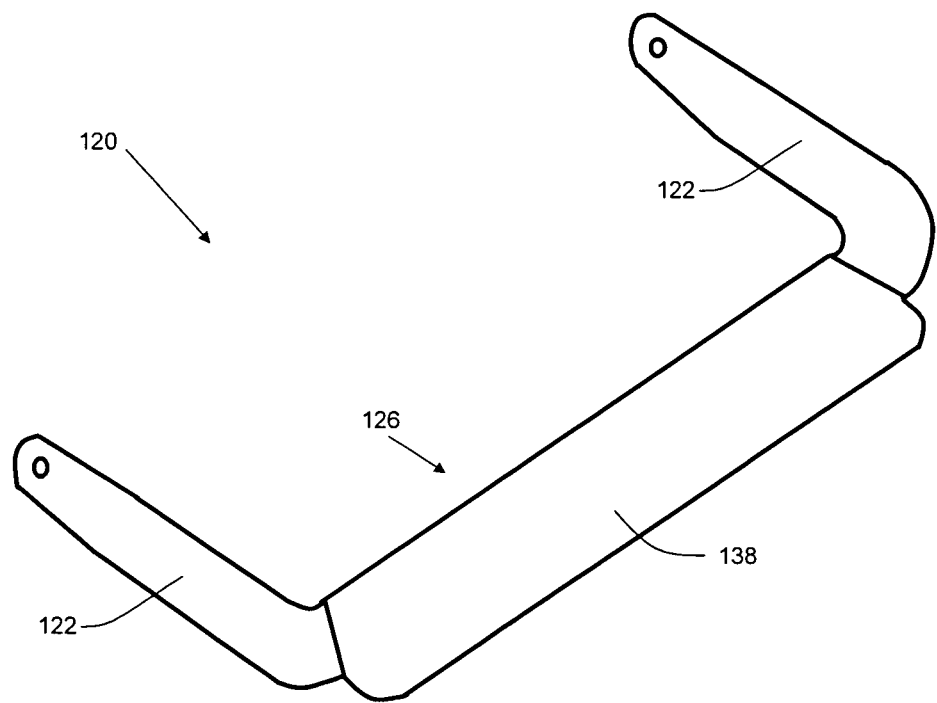
FIG. 6 shows a perspective view of an embodiment of a restraint bar comprising a cam pad.

FIG. 6 shows a perspective view of an embodiment of a restraint bar 120. Restraint bar 120 is comprised of two side arms 122 which are joined by crossbar 126. Cam pad 138 is rotatably disposed around crossbar 126. In use, the cam pad 138 is rotated to provide a snug but comfortable fit for passengers.

Figure 7:
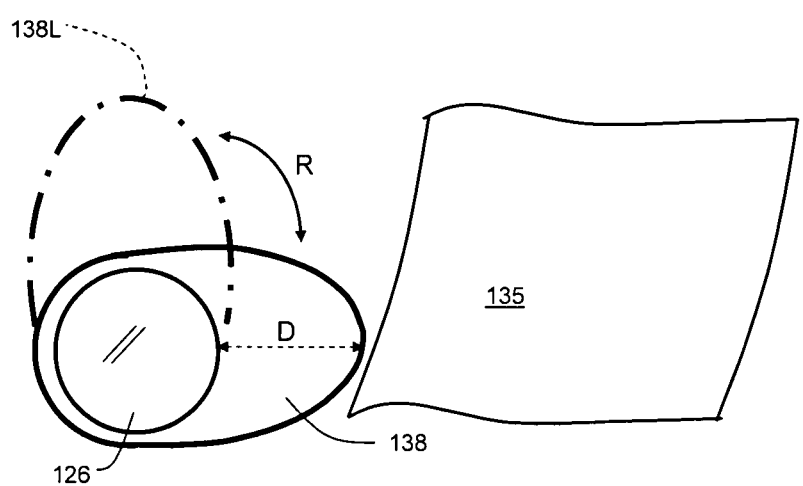
FIG. 7 shows a side view of an embodiment of a cam pad.

FIG. 7 shows a side view of an embodiment of a cam pad 138 disposed around crossbar 126. The cam pad 138 has displacement D, which allows the fit of restraint bar 120 to be adjusted to accommodate the size of the passenger. Cam pad 138 is shown in the tight position. By rotating cam pad 138 in direction R to position 138L (the loose position), additional space is provided between the passenger's body (a portion shown as reference 135), and cam pad 138. In one embodiment, cam pad 138 is comprised of a resilient material such as a closed cell, cellular plastic material made of polyvinyl chloride.

Figure 8:
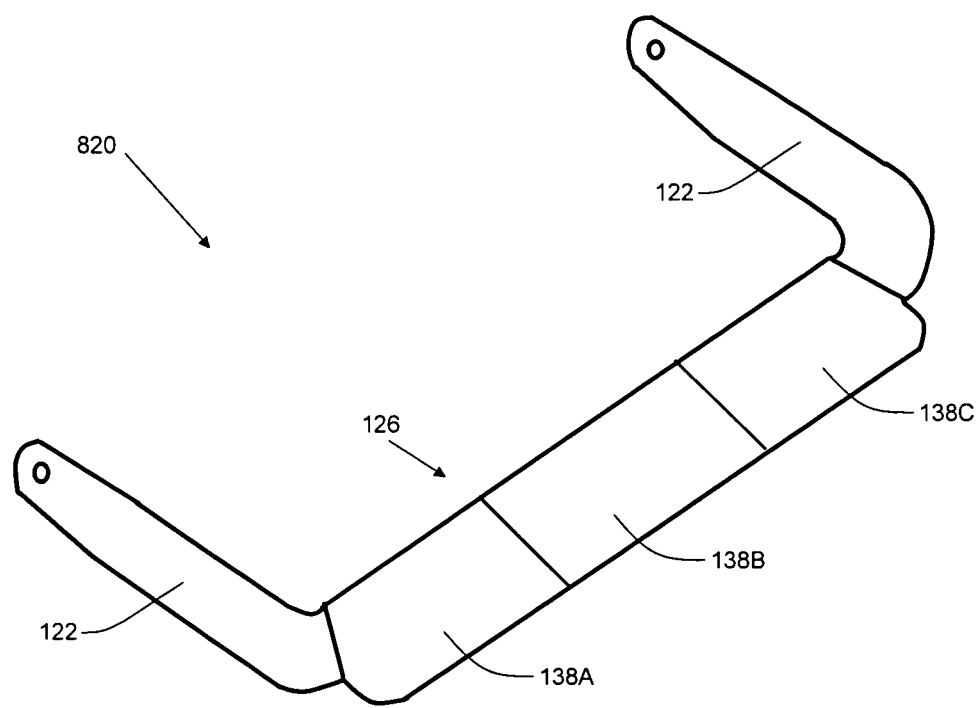
FIG. 8 shows a perspective view of an alternative embodiment of a restraint bar comprising multiple cam pads.

FIG. 8 shows a perspective view of an alternative embodiment of a restraint bar 820 comprising multiple cam pads 138A, 138B, and 138C. Restraint bar 820 is used for a bench seat that accommodates three passengers, which each passenger having their own cam pad (138A, 138B, or 138C) to adjust for a comfortable and secure fit. For a bench seat that accommodates two passengers, a restraint bar with two cam pads (instead of the three pictured in FIG. 8) may be used.

Figure 9A:
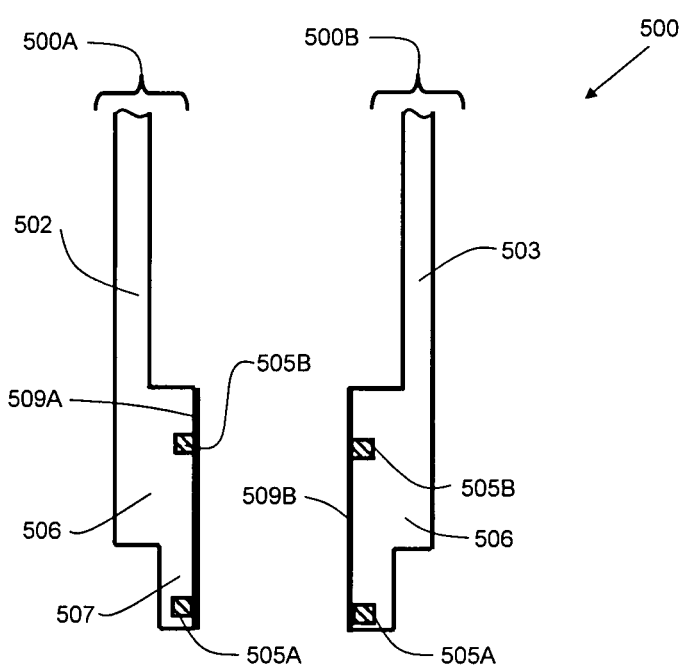
FIGS. 9-11 show use of the safety harness.
Figure 9B:
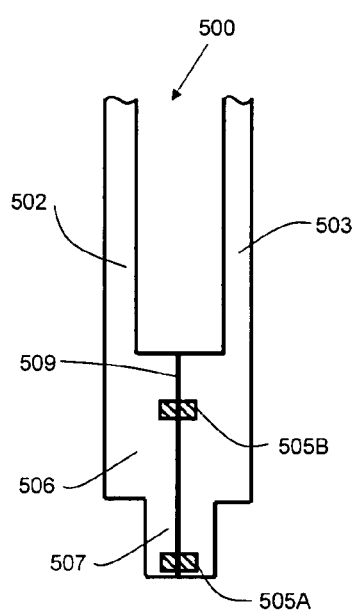
Figure 9C:
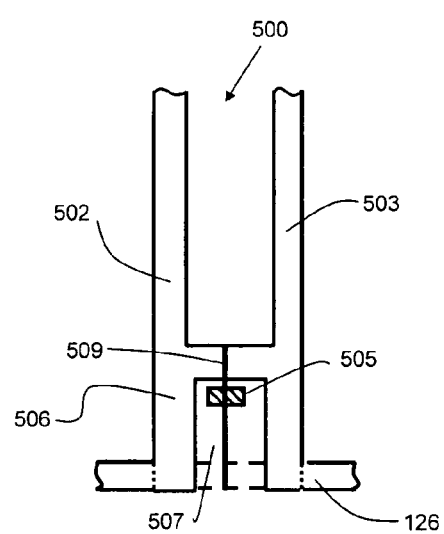
Figure 10:
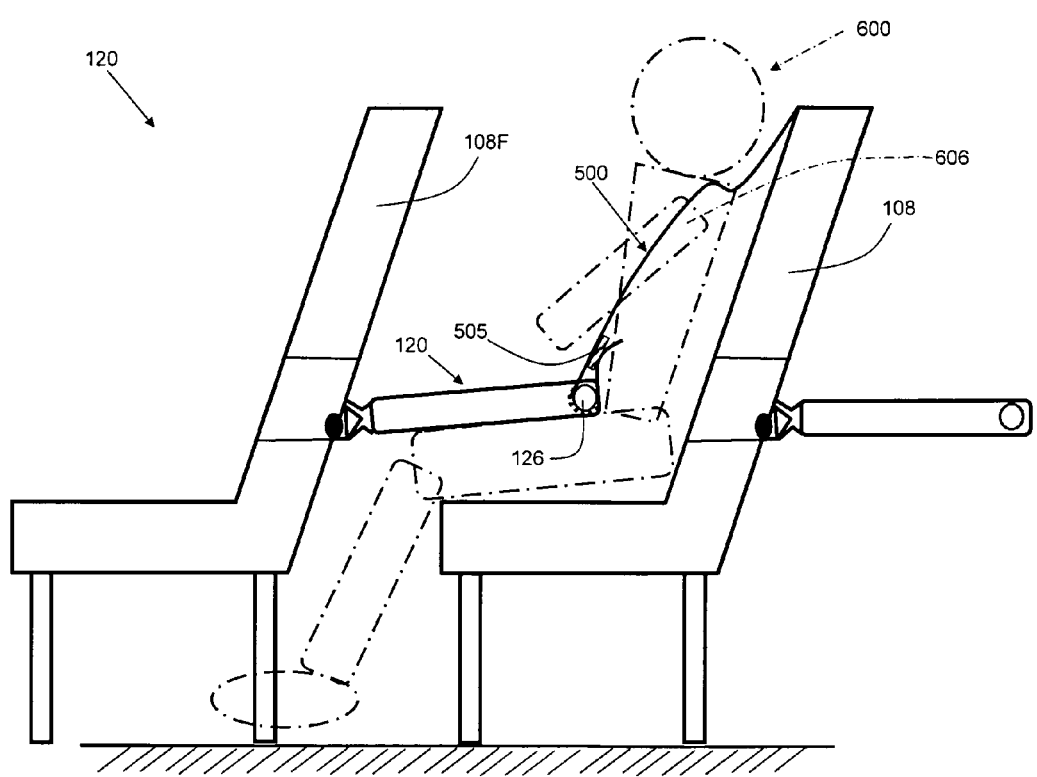
Figure 11:
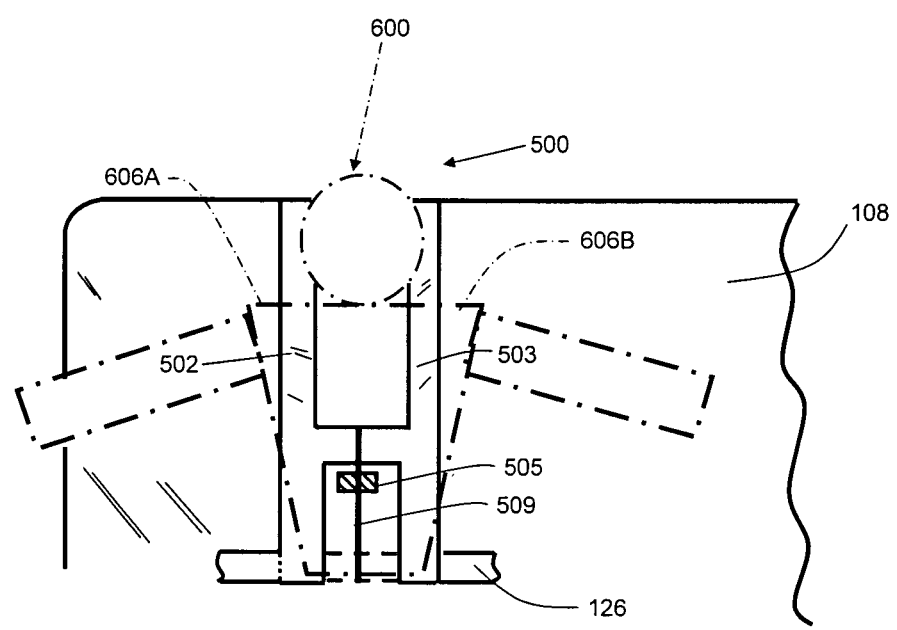

FIGS. 9-11 show use of a safety harness 500. FIG. 9A shows a front view of the safety harness 500 in an unassembled configuration. Safety harness 500 is comprised of two separate pieces 500A and 500B. The pieces 505A and 505B are joined together via joining fasteners 509A and 509B. In one embodiment, joining fasteners 509A and 509B are hook-and-loop fasteners, such as VELCRO. In another embodiment, snaps are used as the fastening mechanism. Shoulder straps 502 and 503 are fastened to the upper portion of the seat, or the seat back, and join at center portion 506 via fasteners 509A and 509B. Affixed to center portion 506 of both 500A and 500B are complementing fasteners 505A and 505B. FIG. 9B shows a front view of the safety harness 500 in an assembled, but unfastened configuration. Shoulder straps 502 and 503 are fastened to the seat back, and join at center portion 506 via joining fastener 509 (joining fastener 509 is comprised of joining fasteners 509A and 509B of FIG. 9A). Affixed to center portion 506 are complementing fasteners 505A and 505B. FIG. 9C shows a front view of the safety harness 500 in an assembled and fastened configuration. In this configuration, flap 507 is wrapped around crossbar 126, and held in place by fasteners 505A and 505B being fastened together (indicated generally as 505 in FIG. 9B). In one embodiment, fasteners 505A and 505B are hook-and-loop fasteners, such as VELCRO. In another embodiment, snaps may be used for fasteners 505A and 505B.

FIG. 10 is a side view of a passenger 600 using a safety harness 500 in accordance with an embodiment of the present invention. FIG. 11 is a front view of the same embodiment. Referring to both FIG. 10 and FIG. 11, harness 500 is fastened to seat back 108, and is placed over the shoulders 606 of the passenger, and then wraps around the crossbar 126 of restraint bar 120 attached to the seat back 108F in front of the passenger 600 and is held in place by the fastener 505 (505 represents the joined fastener of 505A and 505B from FIG. 9B). Fastener 509 represents the joined fastener of 509A and 509B of FIG. 9A. Shoulder strap 502 goes over shoulder 606A and shoulder strap 503 goes over shoulder 606B, of passenger 600. This provides additional protection for the passengers in the event of an impact, by reducing the chance of the occupants getting thrown about the passenger cabin of the bus.

By implementing the safety harness 500 with two separate fastened portions (500A and 500B, see FIG. 9A), protection from injury due to improper use is provided. So long as the safety harness 500 is properly fastened to crossbar 126, additional protection is provided. However, there is always a chance that a passenger may improperly put the fastener around his neck, without securing it to the restraining bar, and possibly even leaving the restraining bar in an exit position. In such a case, in the event of an impact, the restraining harness would unfasten at fastener 509, minimizing the possibility of inflicting injury to the neck or torso of the passenger. While it is expected that recommended safety procedures will be followed, this embodiment provides for situations where the device may not be used properly, and provides features for avoiding injury due to improper use are built into the safety harness 500.

Figure 12:
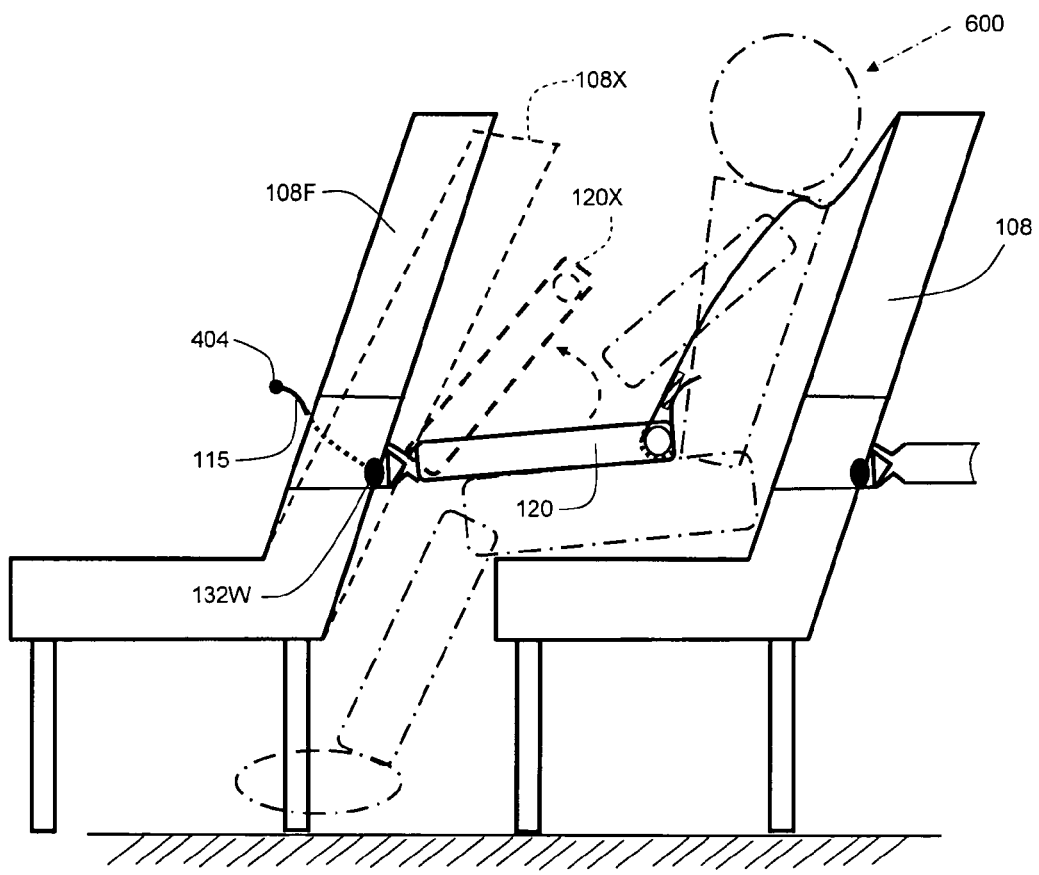
FIG. 12 shows the motion of a restraint bar as the result of a rear end collision.

FIG. 12 shows the motion of a restraint bar 120 as the result of a rear end collision with the school bus (e.g. where the school bus is rear-ended by another vehicle). As a result of the rear end collision, each seat back 108 will deflect in a rearwards direction. The amount of deflection depends on, among other things, the weight of the passengers sitting in that seat, and the force of the rear end collision. Cable 115 is fastened to the bus wall via fastener 404 (see FIG. 4 also) at one end, and the other end of cable 115 is fastened to the hinge mechanism 132W. As a result of the rear end collision, seat back 108F moves to deflected position 108X. As a result, tension on cable 115 increases, and causes restraint bar 120 to move to position 120X, thereby reducing the risk of injury to passenger 600.

As can now be appreciated, embodiments of the present invention provide numerous safety advantages over the prior art devices. These include the automatic release mechanism to automatically lift (release) the safety bar in the event of a rear end collision, thereby reducing the risk of occupants getting rammed by the safety bar due to seat deflection from the seat in front of the occupant, a cam-shaped pad on the safety bar to provide an individual fit, depending on the size of the passenger, and a safety harness to provide additional protection for each passenger. Therefore embodiments of the present invention are well suited to provide additional protection for school children during transportation to and from school and other school related functions.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A passenger restraint system for a vehicle, comprising:
    a seat, the seat comprising a seat back, the seat back having a window side and an aisle side;
    a restraint bar, the restraint bar comprising a crossbar, and two arms, each arm hingedly coupled to the seat back;
    a lifting mechanism, the lifting mechanism configured and disposed to lift the restraint bar during a rearward seat deflection, and
    a linkage, the linkage having a first end configured to be affixed to an interior wall of the vehicle, and the linkage having a second end configured to engage the lifting mechanism.

2. The passenger restraint system of claim 1, further comprising a harness, the harness affixed to an upper portion of the seat, the harness comprising a fastener for securing the harness to the restraint bar.

3. A passenger restraint system for a vehicle, comprising:
    a seat, the seat comprising a seat back, the seat back having a window side and an aisle side;
    a restraint bar, the restraint bar comprising a crossbar, and a plurality of arms, each arm hingedly coupled to the seat back;
    a first release tab, the first release tab hingedly coupled to the seat back;
    a retaining flange, the retaining flange affixed to at least one arm of the restraint bar; and
    a linkage, the linkage having a first end configured to be affixed to an interior surface of the vehicle, and the linkage having a second end affixed to the first release tab, wherein the first release tab is configured and disposed to contact the retaining flange, thereby moving the restraint bar to an exit position when the seat back is in a deflected position.

4. The passenger restraint system of claim 3, wherein the linkage is configured to be affixed to an interior wall of the vehicle.

5. The passenger restraint system of claim 3, wherein the linkage comprises a cable.

6. The passenger restraint system of claim 3, wherein the first end of the linkage is configured to be affixed to the interior surface of the vehicle with a rivet.

7. The passenger restraint system of claim 3, wherein the first end of the linkage is configured to be affixed to the interior surface of the vehicle with a screw.

8. The passenger restraint system of claim 3, wherein the plurality of arms is two arms.

9. The passenger restraint system of claim 3, further comprising a release rod having a first end and a second end, the release rod rotatably coupled to the seat back; wherein the first end of the release rod is coupled to the first release tab.

10. The passenger restraint system of claim 9, further comprising:
    a second release tab, the second release tab hingedly coupled to the seat back wherein the second end of the release rod is coupled to the second release tab.

11. The passenger restraint system of claim 9, further comprising:
    a first hinge plate mounted on the window side of the seat back; a second hinge plate mounted on the aisle side of the seat back; a sleeve affixed to each hinge plate; wherein the release rod is disposed within each sleeve.

12. The passenger restraint system of claim 3, further comprising a cam-shaped pad circumscribing the crossbar.

13. The passenger restraint system of claim 12, wherein the cam-shaped pad is rotatable around the crossbar.

14. The passenger restraint system of claim 13, wherein the cam-shaped pad is comprised of polyvinyl chloride.

15. The passenger restraint system of claim 3, further comprising:
    a harness, the harness comprising two shoulder straps, each shoulder strap affixed to the seat back at one end, and to a center portion at another end; a flap attached to the center portion; wherein the flap is configured and disposed to fasten to the crossbar of the restraint bar.

16. The passenger restraint system of claim 15, wherein the flap further comprises a plurality of hook-and-loop fasteners.

17. The passenger restraint system of claim 15, wherein the flap further comprises a plurality of snap fasteners.

18. The passenger restraint system of claim 15, wherein the harness is comprised of two pieces joined together by a joining fastener.

19. The passenger restraint system of claim 18, wherein the joining fastener comprises a hook-and-loop fastener.

* * * * *